UNITED STATES PATENT OFFICE 2,543,489

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application November 12, 1948, Serial No. 59,765

7 Claims. (Cl. 252—331)

This invention relates to processes or procedures particularly adapted for preventing, breaking or resolving emulsions of the water-in-oil type, and particularly, petroleum emulsions. This application is a continuation-in-part of a number of our co-pending applications, to wit, Serial Nos. 8,722, 8,723, 8,724, 8,725, 8,726, 8,727, 8,728, 8,729, 8,730, 8,731, 8,732, 8,733, and 8,734, all filed on February 16, 1948. Applications Number 8,722, 8,723, 8,724 and 8,726 have now matured into Patents No. 2,499,365; 2,499,366; 2,499,367; and 2,499,368, respectively, all dated March 7, 1950. Application Number 8,734 has now become Patent No. 2,501,015, dated March 21, 1950. Applications Number 8,728, 8,729, 8,730, 8,731, 8,732, 8,733 are now abandoned.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

More specifically, the present invention is concerned with a process for breaking petroleum emulsions of the water-in-oil type, characterized by subjecting the emulsion to the action of a demulsifier including hydrophile synthetic products of the formula:

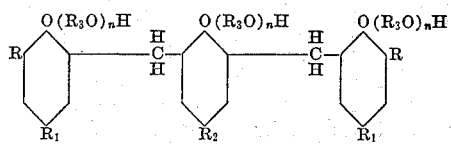

in which R is a member of the class of alkyl, aralkyl, alicyclic and aryl radicals having not over 8 carbon atoms, and $R_1$ and $R_2$ are members of the class of alkyl, aralkyl, alicyclic and aryl hydrocarbon radicals having not over 18 carbon atoms, and $R_3$ is a member of the class of ethylene radicals, propylene radicals, butylene radicals, hydroxypropylene radicals, and hydroxybutylene radicals, and $n$ is a numeral varying from 1 to 20, with the proviso that at least 2 moles of alkylene oxide be introduced for each phenolic nucleus.

In connection with the instant application, we are doing two things which differentiate said invention from the various inventions of the applications referred to above, and they are as follows:

(1) We are concerned with the product of a definite chemical composition, and thus, claims are not concerned with describing the product in terms of method of manufacture, but the demulsifying agent is described in terms of structure only; and (2) Instead of being derived solely or substantially solely from difunctional phenols, the herein described products are resin molecules derived from monofunctional phenols and difunctional phenols jointly, the ratio being two of monofunctional to one of difunctional.

In brief then, the present invention is concerned with the breaking of petroleum emulsions by means of oxyalkylated tri-nuclear resins of the kind hereinafter described. For convenience, the subject-matter is divided into three parts, as follows:

Part 1.—Preparation of tri-nuclear phenolic condensation products of the following formula:

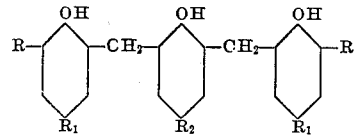

in which R is a member of the class of alkyl radicals, having not over 8 carbon atoms and $R_1$ and $R_2$ are members of the class of alkyl, aralkyl and alicyclic hydrocarbon radicals having not more than 18 carbon atoms. R and $R_1$ will be illustrated by subsequent examples.

Part 2 is concerned with the oxyalkylation of the above-described tri-nuclear resin molecules.

Part 3 is concerned with breaking of petroleum emulsions of the water-in-oil type by means of the above described oxyalkylated derivatives.

PART 1

The preparation of tri-nuclear phenolic resins of known composition which can be stated with specificity appears to be limited to formaldehyde derivatives. Such resin molecules are tri-nuclear condensation products, are well known, and have been described in the literature. For example, see U. S. Patent No. 2,440,909, dated May 4, 1948, to Niederl.

The method of producing tri-nuclear molecules of the kind described generally depends upon four separate steps;

(a) Obtaining an ortho-substituted phenol, in which the substituent is a hydrocarbon radical, particularly an alkyl radical, aryl, alicyclic, or aralkyl. Ordinarily, the phenols are subjected to alkylation, as in the production of phenylphenol, octylphenol, benzylphenol, amylphenol, butylphenol, etc. The bulk of the compound obtained, generally 85% to 95%, is para-substituted and a comparatively small fraction, 5% to 15%, is the ortho-substituted compound. The bulk of such phenols find employment in resins for the varnish industry where the use of ortho-substituted phenols seems to be objectionable, and as a rule, they are removed, and as far as practical, the ortho-substituted phenol and the para-substituted phenol are sold separately. A number of ortho-substituted phenols are available in the open market, as, for example, ortho-cresol, ortho-propylphenol, ortho secondary amylphenol, ortho tertiary amylphenol, ortho tertiary butylphenol, ortho cyclohexylphenol, etc. It does not seem feasible to make a separation when the substituent has more than 8 carbon atoms. Such phenols may be designated by the following formula:

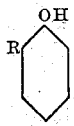

in which R represents a hydrocarbon substituent having not over 8 carbon atoms and being alkyl, alicyclic, aralkyl, or aryl in character.

(b) Having obtained such ortho-substituted phenol, it can be treated in the conventional manner to yield a monofunctional phenol with a new hydrocarbon substituent in the para position. Various methods may be employed, the most desirable method being the use of a tertiary alcohol with anhydrous aluminum chloride as a catalyst. See D'Alelio, "Experimental Plastics and Synthetic Resins," John Wiley & Sons, Inc., New York, 1946, page 30, or numerous patents concerned with the preparation of para-substituted phenols. Thus, one of the two initial phenols employed is an ortho-substituted phenol of the following composition, in which R represents an alkyl, alicyclic, aralkyl, or aryl radical having not over 8 carbon atoms.

The aryl radical may be the phenyl, methylphenol, or dimethylphenol; the aralkyl may be phenylethyl, benzyl, etc.; the alicyclic may be cyclohexyl, methyl cyclohexyl, etc. The alkyls have been illustrated by previous examples. Such phenol is then reacted in a conventional manner so as to yield a monofunctional phenol of the following structure:

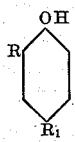

in which $R_1$ has the same significance as R, except that it must contain at least 4 carbon atoms.

Previous reference has been made to the alkylation of phenol with reference to the ratio of para-ortho - substituted phenols obtained. In many instances, the alkylation process yields at least small amounts of disubstituted phenols, i. e., monofunctional phenol. In other instances, the ratio of the alkylating agent to phenol is increased so as to produce intentionally a greater or even quantitative yield of the di-substituted monofunctional phenols. A number of such disubstituted phenols are available in the open market. We prefer to employ the most readily available disubstituted phenols, particularly the monofunctional di-butylphenol, monofunctional di-amylphenol, and mono-functional dinonylphenol, or 2-methyl-4-octylphenol.

(c) The method of obtaining methylol derivatives from difunctional phenols or monofunctional phenols is well known. For instance, the method of obtaining such monomethylol derivatives is well known. For example, 6-methylol-2-methyl-4-tt-octylphenol of the following structure:

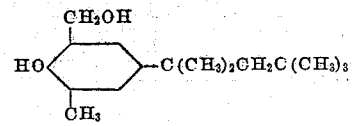

is described in the above-mentioned U. S. Patent No. 2,440,909. Other non-methylol derivatives are derived by the same procedure or equivalent procedures invariably involving the use of a strong alkali catalyst and formaldehyde, for instance, the derivatives thus obtainable may be indicated by the following formula:

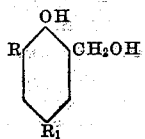

in which R and $R_1$ have their previous significance.

Previous reference has been made to the dimethylol derivatives derived from difunctional phenols, such as, for example, 2,6-dimethylol-4-tt-octylphenol which has the following structure:

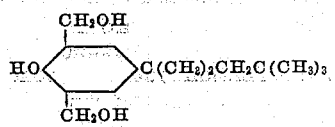

The previous reference to D'Alelio describes the production of di-alcohols from tertiary butylphenol, tertiary amylphenol, phenylphenol, or styrylphenol, and dimethylol phenols having the following structure:

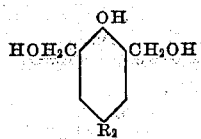

in which $R_2$ represents any hydrocarbon substituent having not over 18 carbon atoms and selected from the class consisting of alkyl, alicyclic, aralkyl, and aryl. Such dimethylol phenols are obtainable, not only from the substituted phenols previously described, but more highly substituted phenols, particularly those obtained indirectly from the higher fatty acids by introducing 10 to 18 carbon atoms, as in the case of decylphenol, dodecylphenol, hexadecylphenol, octadecylphenol, etc. In regard to hydroxymethyl derivatives of phenol, see also Journal American Chemical Society, 70, No. 4, 1662 (1948).

(d) Two general procedures are available for the production of the tri-substituted phenols:

(A) React two moles of a monofunctional phenol with one mole of a dimethylolphenol, or (B) React two moles of the mono-methylolphenol with one mole of the para-substituted phenol. These reactions will be illustrated thus:

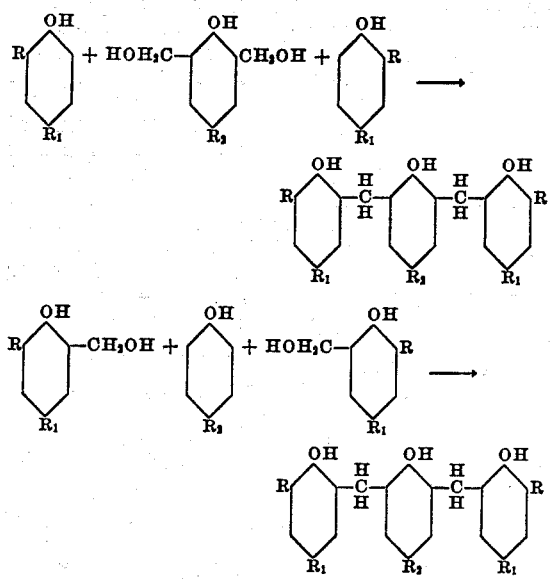

The conditions for producing such tri-nuclear molecules are well known, having been described, for example, in the above mentioned Niederl patent and elsewhere. For instance, such Niederl patent describes specifically the following typical tri-nuclear products:

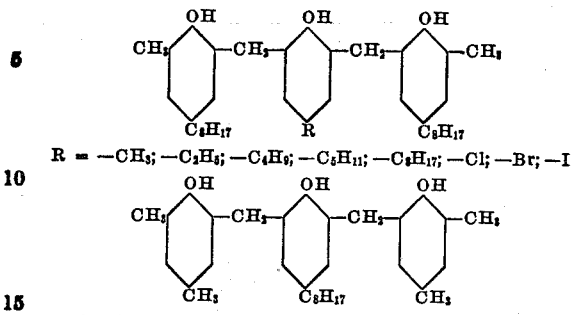

$R = -CH_3; -C_2H_5; -C_4H_9; -C_5H_{11}; -C_8H_{17}; -Cl; -Br; -I$

The tri-nuclear phenolic resins advantageously employed as initial raw material to be subjected to oxyalkylation, are the following: All of these compounds are obtained either from commercially available ortho-substituted phenols, or from commercially available monofunctional phenols, or from commercially available alkylating agents, particularly adapted to the alkylation of phenols or combination of such commercially available materials.

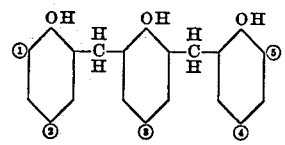

|  | A | B | C | D | E |
|---|---|---|---|---|---|
| 1 | methyl | methyl | methyl | methyl | methyl |
| 2 | tert-amyl | tert-amyl | tert-amyl | tert-amyl | tert-amyl |
| 3 | tert-butyl | tert-amyl | tert-octyl | nonyl | menthyl |
| 4 | tert-amyl | tert-amyl | tert-amyl | tert-amyl | tert-amyl |
| 5 | methyl | methyl | methyl | methyl | methyl |
| Mol. Wt. of Cmpd | 530 | 544 | 586 | 600 | 612 |

|  | F | G | H | I | J |
|---|---|---|---|---|---|
| 1 | tert-amyl | tert-amyl | tert-amyl | tert-amyl | tert-amyl |
| 2 | tert-butyl | tert-butyl | tert-butyl | tert-butyl | tert-butyl |
| 3 | tert-butyl | tert-amyl | tert-octyl | nonyl | menthyl |
| 4 | tert-butyl | tert-butyl | tert-butyl | tert-butyl | tert-butyl |
| 5 | tert-amyl | tert-amyl | tert-amyl | tert-amyl | tert-amyl |
| Mol. Wt. of Cmpd | 614 | 628 | 670 | 684 | 696 |

|  | K | L | M | N | O |
|---|---|---|---|---|---|
| 1 | phenyl | phenyl | phenyl | phenyl | phenyl |
| 2 | tert-octyl | tert-octyl | tert-octyl | tert-octyl | tert-octyl |
| 3 | tert-butyl | tert-amyl | tert-octyl | nonyl | menthyl |
| 4 | tert-octyl | tert-octyl | tert-octyl | tert-octyl | tert-octyl |
| 5 | phenyl | phenyl | phenyl | phenyl | phenyl |
| Mol. Wt. of Cmpd | 738 | 752 | 794 | 808 | 820 |

|  | P | Q | R | S | T |
|---|---|---|---|---|---|
| 1 | cyclohexyl | cyclohexyl | cyclohexyl | cyclohexyl | cyclohexyl. |
| 2 | octyl | octyl | octyl | octyl | octyl. |
| 3 | tert-butyl | tert-amyl | tert-octyl | nonyl | menthyl. |
| 4 | tert-octyl | tert-octyl | tert-octyl | tert-octyl | tert-octyl. |
| 5 | cyclohexyl | cyclohexyl | cyclohexyl | cyclohexyl | cyclohexyl. |
| Mol. Wt. of Cmpd | 726 | 764 | 806 | 820 | 732 |

|  |  |  |  |  |  |
|---|---|---|---|---|---|
| 1 | tert-butyl | tert-butyl | tert-butyl | tert-butyl | tert-butyl. |
| 2 | nonyl | nonyl | nonyl | nonyl | nonyl. |
| 3 | tert-butyl | tert-amyl | tert-octyl | nonyl | menthyl. |
| 4 | nonyl | nonyl | nonyl | nonyl | nonyl. |
| 5 | tert-butyl | tert-butyl | tert-butyl | tert-butyl | tert-butyl. |
| Mol. Wt. of Cmpd | 726 | 740 | 782 | 796 | 808 |

PART 2

Having obtained a tri-nuclear phenolic molecule or resin of the kind described by the formula:

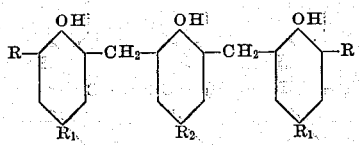

in which R is a member of the class of alkyl radicals, having not over 8 carbon atoms and $R_1$ is a member of the class of alkyl (aralkyl) and alicyclic hydrocarbon radicals having not more than 18 carbon atoms, the next step is that of oxyalkylation, particularly oxyethylation. The procedure employed is substantially the same as described in various of the preceding co-pending applications, particularly Serial No. 8,730 and Serial No. 8,731, filed February 16, 1948.

Briefly stated, the process is essentially as follows: The tri-nuclear compound or resin is mixed with a suitable amount of solvent, for instance, about one-third or one-fourth its weight of xylene. Some other solvent, such as cymene, or the like, can be employed. An alkaline catalyst, such as caustic potash, caustic soda, sodium carbonate, sodium methylate, or the like, is added. Our preference is to use approximately 2.0% to 2.5% of sodium methylate, based on the weight of the solvent-free compound. The mixture of compound, solvent, and alkaline catalyst (sodium methylate), is placed in a stirring autoclave and ethylene oxide or any other selected alkylene oxide added, either continuously or batchwise. For various reasons, our preferred alkylene oxide is ethylene oxide. It will be noted that the present compounds are characterized by the addition of two or more moles of the alkylene oxide per phenolic nucleus. Thus, assuming uniform distribution, the previous formula can be rewritten as follows:

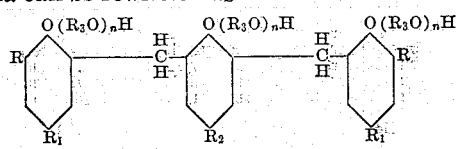

in which the various characters have their previous significance and $R_3$ is a member selected from the class of ethylene radicals, propylene radicals, butylene radicals, hydroxypropylene radicals, and hydroxybutylene radicals, and $n$ is a numeral varying from 1 to 20, with the proviso that at least 2 moles of alkylene oxide be introduced per phenolic nucleus and assuming even distribution of the alkylene oxide, our preferred values for $n$ are 2, 4 and 6. Such oxyalkylation procedure is illustrated by the following examples:

Example 1

530 grams of a trinuclear compound of the kind characterized by the formula "A" preceding, is mixed with 135 grams of xylene and 12 grams of sodium methylate. The mixture is placed in an autoclave and 132 grams of ethylene oxide added. The temperature is raised to 150° to 160° C. The autoclave is stirred rapidly during this period and the maximum pressure usually remains between 155 to 185 pounds per square inch. At the end of approximately 2½ to 4 hours, the pressure is dropped to almost zero, particularly when the autoclave is cooled to room temperature. At the end of this period, the ethylene oxide is reacted completely so as to give a product having incipient hydrophile properties characterized by the introduction of one mole of ethylene oxide per phenolic nucleus based on average distribution. The reaction mass is subjected to a second treatment of ethylene oxide in substantially the same manner so as to introduce an additional 132 grams of ethylene oxide. The procedure and conditions of operation, i. e., temperature, pressure, etc., are substantially the same as before. The final product obtained is a light amber-colored fluid, having distinctly emulsifiable properties and having an average ratio of two for the character $n$ previously noted.

Example 2

The same procedure is followed as in Example 1, preceding, except that 4 additions of ethylene oxide are made under substantially the same operating conditions, so as to introduce a total of 528 grams of ethylene oxide. The final product contains proportionately less xylene and is somewhat lighter in color, and is readily dispersible. In this instance the value of $n$ is 4.

Example 3

The same procedure is repeated as in the two preceding examples, except that the total amount of ethylene oxide added is 792 grams in six proportions of 132 grams each. If the addition of ethylene oxide tends to slow down during the final phase when the fifth and sixth additions are made, we have found it desirable to cool the reaction vessel, add another five to six grams of sodium methylate, and then start up again, going through the complete reaction period. By addition of such amount of added catalyst, in the fifth or sixth stage, addition of ethylene oxide can be made under substantially the same operating conditions as the earlier stage in regard to time, temperature and pressure. The final product is a light amber-colored fluid, disperses very readily to give only a mildly turbid or even a clear solution. The value for $n$ in this instance is 6.

Example 4

The same procedure is followed as in Example 1, preceding, except that the tri-nuclear compound employed is "C" preceding, and the amount employed is 586 grams instead of 530 grams.

Example 5

The same procedure is followed as in Example 1, preceding, except that the tri-nuclear compound employed is "F" preceding, and the amount employed is 614 grams instead of 530 grams.

Example 6

The same procedure is followed as in Example 1, preceding, except that the tri-nuclear compound employed is "G" preceding, and the amount employed is 628 grams instead of 530 grams.

Example 7

The same procedure is followed as in Example 1, preceding, except that the tri-nuclear compound employed is "H" preceding, and the amount employed is 670 grams instead of 530 grams.

Example 8

The same procedure is followed as in Example 1, preceding, except that the tri-nuclear compound employed is "H" preceding, and the amount employed is 794 grams instead of 530 grams.

*Example 9*

The same reactants and the same procedures were employed as in Example 1 to 8, preceding, except that propylene oxide was used instead of ethylene oxide in the same molar proportions, i. e., so the values of $n$ still represented 2, 4 and 6, based on average distribution. The resultants, even on addition of the same molar amount of propylene oxide, have diminished hydrophile properties, in comparison with the resultants obtained with ethylene oxide. This illustrates the point that propylene oxide and butylene oxide give products of lower levels of hydrophile properties than does ethylene oxide.

*Example 10*

The same reactants and the same procedures were employed as in Examples 1 to 8, preceding, except that glycide was used instead of ethylene oxide. This particular reaction was conducted with extreme care and the glycide added in only small amounts representing a fraction of a mole. The reaction was stopped when two moles of glycide were added per mole of phenolic nucleus. We are extremely hesitant to suggest even the experimental use of glycide and methylglycide for the reason that disastrous results can be obtained, even in experimentation with laboratory quantities. We have found no advantage to be obtained, particularly from the economic standpoint, in any of the oxides other than ethylene oxide, and propylene oxide. We have found no genuine advantage from the use of propylene oxide over and above ethylene oxide. Ethylene oxide is definitely our preferred and the most advantageous oxyalkylating agent.

If desired, oxyalkylation, particularly oxyethylation, can be conducted without the use of a solvent. All that is required is that the phenolic compound be a liquid at the temperature of oxyethylation, for instance, between 150° to 200° C. If a solvent is employed there is no objection to the solvent being present in the final product for many uses, and particularly for demulsification. If desired, of course, products exemplified by previous examples, to wit, Examples 1 to 10, inclusive, may be subjected to distillation, particularly vacuum distillation, to remove the solvent, such as xylene; for instance, we have found that raising the temperature to 150° C. under a vacuum in 25 mm. of mercury, removes the xylene readily.

PART 3

Conventional demulsifying agents employed in the treatment of oil field emulsions are used as such, or after dilution with any suitable solvent, such as water, petroleum hydrocarbons, such as benzene, toluene, xylene, tar acid oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil and water-solubility. Sometimes they may be used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations. This same fact is true in regard to the material or materials employed as the demulsifying agent of our process.

In practising our process for resolving petroleum emulsions of the water in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from e. g., the bottom of the tank, and re-introduces it into the top of the tank, the demulsifier being added, for example, at the suction side of said circulating pump.

In a second type of treating procedure, the demulsifier is introduced into the well fluids at the well-head, or at some point between the well-head and the final oil storage tank, by means of an adjustable proportioning mechanism or proportioning pump. Ordinarily, the flow of fluids through the subsequent lines and fittings suffices to produce the desired degree of mixing of demulsifier and emulsion, although in some instances, additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion, either through natural flow, or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier dropwise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do no disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts, by weight, of an oxyalkylated derivative, for example, the product of Example 3, with 15 parts, by weight, of xylene and 10 parts, by weight, of isopropyl alcohol, an excellent demulsifier is obtained. Selection of the solvent will vary, depending upon the solubility characteristics of the oxyalkylated product, and of course, will be dictated, in part, by economic considerations, i. e., cost.

As noted above, the products herein described may be used not only in diluted form, but also may be used admixed with some other chemical demulsifier. A combination illustrating what has been said may employ a mixture comprising:

Oxyalkylated derivative, for example, the product of Example 3, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

The instant application is concerned with the use of oxyalkylated resinous compounds or derivatives thereof for demulsification of petroleum emulsions of the water-in-oil type. It is obvious that the alicyclic analogues derived by nuclear hydrogenation are equally serviceable for this purpose, and particularly as intermediates for the manufacture of more complex compounds for use as demulsifying agents. In a general way, conversion of the aromatic material to an alicyclic material follows either one or two procedures: One can hydrogenate the resin in a conventional manner, followed by oxyalkylation of the hydrogenated resin in substantially the same manner as is employed in the case of the non-hydrogenated resin. The second procedure is to hydrogenate the oxyalkylated derivative, rather than the resin itself. As an example of such procedure, reference is made to our co-pending application Serial No. 726,201, filed February 3, 1947 (now abandoned).

Having thus described our invention, what we claim and desire to secure by Letters Patent is:

1. A process for breaking petroleum emulsions of the water-in-oil type, characterized by subjecting the emulsion to the action of a demulsifier including hydrophile synthetic products of the formula:

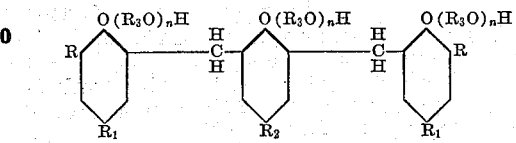

in which R is a member of the class consisting of alkyl, aralkyl, alicyclic and aryl radicals having not over 8 carbon atoms, and R₁ and R₂ are members of the class consisting of alkyl, aralkyl, alicyclic and aryl hydrocarbon radicals having not over 18 carbon atoms, and R₃ is a member of the class consisting of ethylene radicals, propylene radicals, butylene radicals, hydroxypropylene radicals, and hydroxybutylene radicals, and $n$ is a numeral varying from 1 to 20, with the proviso that at least 2 moles of alkylene oxide be introduced for each phenolic nucleus.

2. A process for breaking petroleum emulsions of the water-in-oil type, characterized by subjecting the emulsion to the action of a demulsifier including hydrophile synthetic products of the formula:

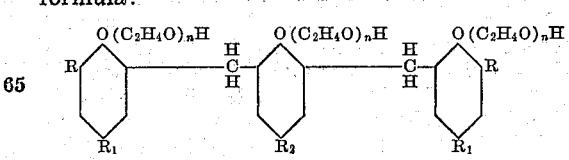

in which R is a member of the class consisting of alkyl, aralkyl, alicyclic and aryl radicals having not over 8 carbon atoms, and R₁ and R₂ are members of the class consisting of alkyl, aralkyl, alicyclic and aryl hydrocarbon radicals having not over 18 carbon atoms, and $n$ is a numeral varying from 1 to 20, with the proviso that at least 2 moles of ethylene oxide be introduced for each phenolic nucleus.

3. The process of claim 2, wherein $n$ is not greater than 6.

4. The process of claim 2, wherein $n$ is not greater than 6 and all nuclear substituent hydrocarbon radicals are alkyl.

5. The process of claim 2, wherein $n$ is not greater than 6 and all nuclear substituent hydrocarbon radicals are alkyl radicals having at least 4 and not more than 8 carbon atoms.

6. The process of claim 2, wherein $n$ is not greater than 6 and all nuclear substituent hydrocarbon radicals are alkyl radicals having 4 to 8 carbon atoms, with the added proviso that there is at least one occurrence of a butyl radical.

7. The process of claim 2, wherein $n$ is not greater than 6 and all nuclear substituent hydrocarbon radicals are alkyl radicals having 4 to 8 carbon atoms, with the added proviso that there is at least one occurrence of an amyl radical.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,076,624 | De Groote | Apr. 13, 1937 |
| 2,243,330 | De Groote et al. | May 27, 1941 |
| 2,307,058 | Moeller | Jan. 5, 1943 |
| 2,317,726 | Boedeker et al. | Apr. 27, 1943 |
| 2,430,002 | De Groote et al. | Nov. 4, 1947 |
| 2,430,003 | De Groote et al. | Nov. 4, 1947 |
| 2,454,541 | Bock et al. | Nov. 23, 1948 |